US009353873B2

(12) United States Patent  
Zollinger

(10) Patent No.: US 9,353,873 B2  
(45) Date of Patent: May 31, 2016

(54) BALL VALVE HAVING CONICALLY SHAPED STEM SEAL

(71) Applicant: Peter Zollinger, Hombrechtikon (CH)

(72) Inventor: Peter Zollinger, Hombrechtikon (CH)

(73) Assignee: Pentair Flow Services AG, Schaffhausen (CH)

( * ) Notice: Subject to any disclaimer, the term of this patent is extended or adjusted under 35 U.S.C. 154(b) by 0 days.

(21) Appl. No.: 14/502,824

(22) Filed: Sep. 30, 2014

(65) Prior Publication Data

US 2015/0090916 A1    Apr. 2, 2015

Related U.S. Application Data

(60) Provisional application No. 61/884,792, filed on Sep. 30, 2013.

(51) Int. Cl.
*F16K 5/00* (2006.01)
*F16K 5/06* (2006.01)
*F16K 41/14* (2006.01)

(52) U.S. Cl.
CPC ............. *F16K 5/0694* (2013.01); *F16K 5/0657* (2013.01); *F16K 41/14* (2013.01)

(58) Field of Classification Search
CPC .. F16K 27/067; F16K 27/0272; F16K 5/0694
USPC .................... 251/214, 315.01, 315.03, 315.1, 251/315.13, 315.14
See application file for complete search history.

(56) References Cited

U.S. PATENT DOCUMENTS

| 3,073,336 | A | * | 1/1963 | Johnson ..................... 137/375 |
| 3,753,569 | A | * | 8/1973 | Bonomi ..................... 277/532 |
| 4,696,323 | A | * | 9/1987 | Iff ................................ 137/375 |
| 5,634,486 | A | * | 6/1997 | Hatting et al. .......... 137/315.01 |
| 6,161,569 | A | * | 12/2000 | Gonsior .................... 137/375 |
| 6,669,171 | B1 | | 12/2003 | Stunkard |
| 7,080,822 | B2 | | 7/2006 | Tulaskar |
| 8,382,067 | B2 | | 2/2013 | Xu |
| 8,910,921 | B2 | * | 12/2014 | Crochet et al. ............ 251/214 |
| 2011/0012044 | A1 | | 1/2011 | Wetzel et al. |
| 2011/0017931 | A1 | * | 1/2011 | Lee ........................ 251/315.05 |

* cited by examiner

*Primary Examiner* — John K Fristoe, Jr.
*Assistant Examiner* — Reinaldo Sanchez-Medina
(74) *Attorney, Agent, or Firm* — Quarles & Brady LLP

(57) ABSTRACT

A ball valve including a valve body that includes a first body member and a second body member. The valve body defines a valve axis and a fluid flow path. A ball element has a port and a ball stem, and is rotatable about a ball stem axis between an open position providing fluid flow through the fluid flow path and a closed position inhibiting flow through the fluid flow path. A body seal is located between the first body member and the second body member and defines a thickness that decreases as the body seal extends away from the valve axis. A stem seal defines a substantially frusto-conical shape and is arranged in the valve body. The ball stem extends through the stem seal to form a seal between the ball stem and the stem seal and between the stem seal and the valve body.

20 Claims, 6 Drawing Sheets

BALL VALVE HAVING CONICALLY SHAPED STEM SEAL

RELATED APPLICATIONS

This application claims the benefit of U.S. Provisional Application No. 61/884,792 filed on Sep. 30, 2013, the entire disclosure of which is hereby incorporated herein by reference.

BACKGROUND

The invention relates generally to ball valves which are used in a chemical/pharmaceutical plant handling corrosive chemicals. In some applications, the ball valves control or shut-off the flow of fluids through pipelines in the plant. The ball valves can be operated using either a handle/lever fixed on top of the stem or with an actuator fitted over the top portion of the ball valve by means of a bracket/flange.

BRIEF SUMMARY OF THE INVENTION

A ball valve having a valve body which defines a valve axis is disclosed. The valve body includes first and second body members each including a fluid flow path. The ball valve also includes a ball element having a port and a ball stem, wherein the ball element is rotatable within the valve body between an open position and a closed position. The ball valve also includes a body seal that is located between the first and second body members, wherein a thickness of the body seal decreases as the body seal extends from the valve axis. The body joint of the first and second body defines a metal-to-metal contact to counter the effect of uneven piping loads. Further, the ball valve includes a spring loaded stem seal located in the valve body, wherein the ball stem extends through the stem seal element to form a seal between the ball stem and the stem seal element and between the stem seal element and the valve body, wherein the stem seal element has a generally conical shape.

All the interior surfaces coming in contact with fluid/gas are lined with a corrosion resistant plastic such as a fully fluorinated Fluoropolymer like Teflon®. The Teflon® materials referred to herein are fully fluorinated fluoropolymers including, but not limited to PTFE, PVDF, ETFE, PFA, TFM™ from Dyneon™ or NXT from DuPont™. The lining of the interior of the housing also extends over the joining face between the two body halves and acts as a sealing gasket.

In one aspect, the present invention provides a ball valve including a valve body that includes a first body member and a second body member. The valve body defines a valve axis and a fluid passageway. A ball element has a port and a ball stem, and is rotatable about a ball stem axis between an open position providing fluid flow through the fluid passageway and a closed position inhibiting flow through the fluid passageway. A body seal is located between the first body member and the second body member and defines a thickness that decreases as the body seal extends away from the valve axis. A stem seal defines a substantially frusto-conical shape and is arranged in the valve body. The ball stem extends through the stem seal to form a seal between the ball stem and the stem seal and between the stem seal and the valve body.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

DETAILED DESCIPTION OF THE INVENTION

Figure 1A:
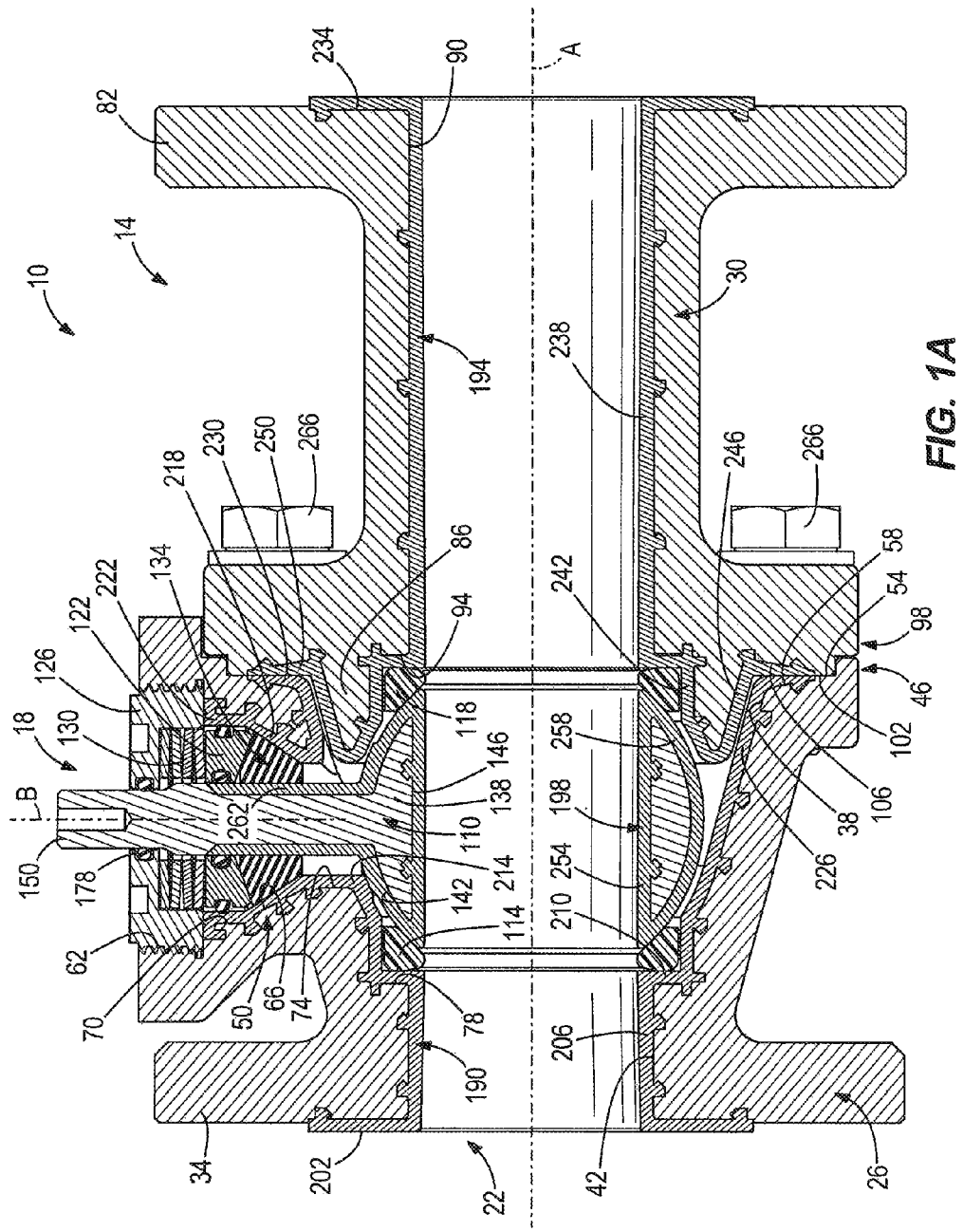
FIG. 1A is a section view of a ball valve according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention. In the description below, like reference numerals and labels are used to describe the same, similar, or corresponding parts in the several views of FIGS. 1-6.

FIG. 1A shows a ball valve 10 having a valve body 14, a ball assembly 18, and a lining 22. The valve body 14 includes a first body member 26 and a second body member 30, and defining a valve axis A. The illustrated first body member 26 and the second body member 30 are fabricated from metal.

The first body member 26 includes a first mounting feature in the form of a flange 34 arranged for mounting to a pipe (not shown), a recessed portion 38, a first passageway 42 along the valve axis A, a first fastener engaging feature in the form of a threaded through hole (not shown) for engaging the second body member 30, a first mating surface 46, and a ball assembly support structure 50. In other arrangements, the first mounting feature 34 can include pipe threads or be arranged differently to mount to a pipe, as desired.

Figure 1B:
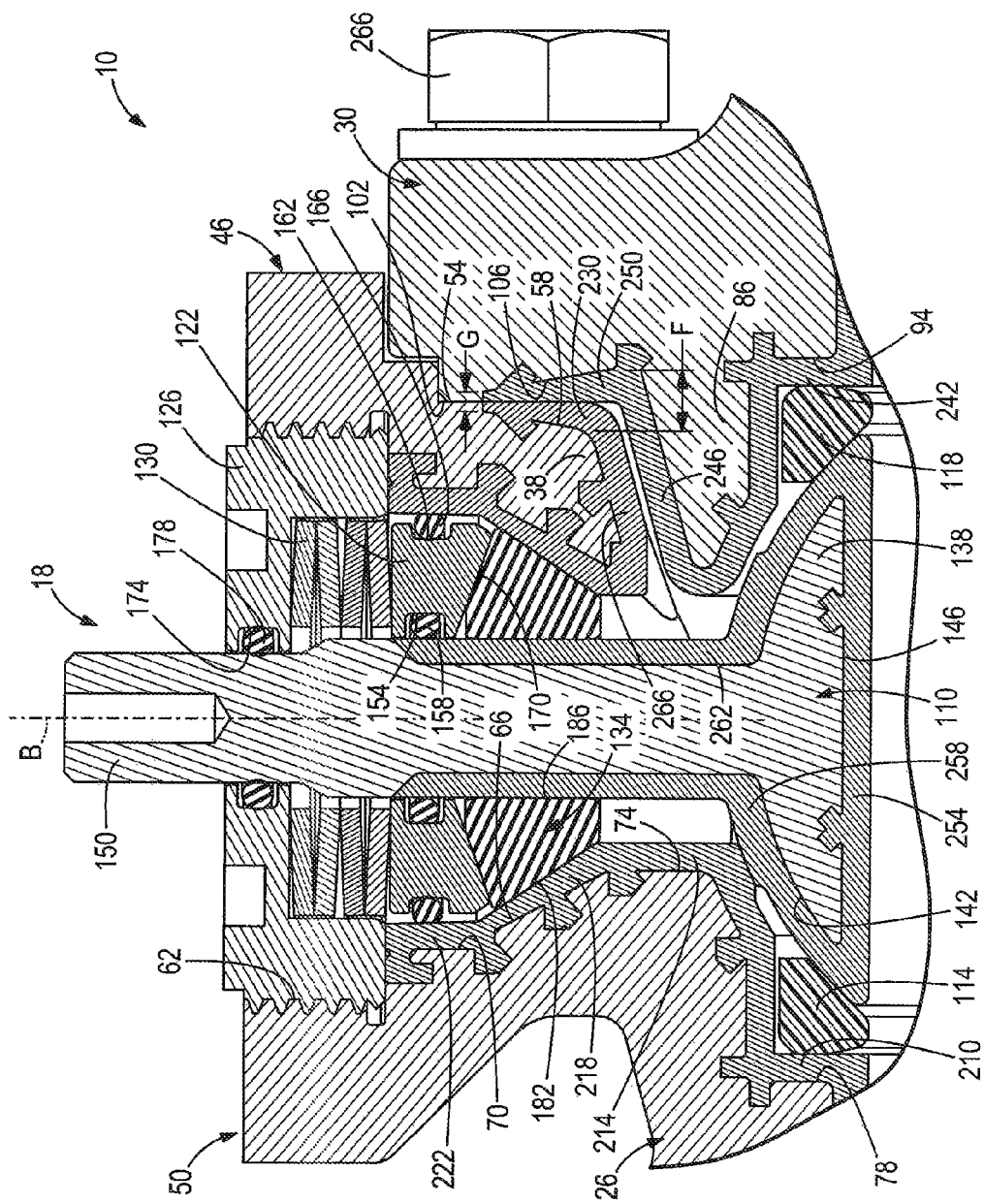
FIG. 1B is an enlarged view of a portion of the ball valve of FIG. 1A.

With reference to FIG. 1B, the first mating surface 46 may be generally defined as the surface that engages and seals against the second body member 30. The illustrated first mating surface 46 includes a first outer portion 54 and a first body seal recess 58. The first outer portion 54 defines a flat wall arranged substantially perpendicular to the valve axis A and an adjacent radial wall arranged substantially parallel to the valve axis A. The particular arrangement of the first outer portion 54 may be different that depicted in other embodiments. For example, the walls may be arranged at different angles relative to the valve axis A, or may include other walls, as desired.

The first body seal recess 58 is positioned adjacent to the first outer portion 54 and radially inward with respect to the valve axis A. The first body seal recess 58 defines a gradually decreasing depth moving radially outward from the valve axis A. The recessed portion 38 is arranged radially inward of the first body seal recess 58 and sloped toward the valve axis A at an oblique angle relative thereto.

The ball assembly support structure 50 defines a threaded aperture 62, a tapered wall 66, a press ring wall 70 arranged between the threaded aperture 62 and the tapered wall 66, a stem cavity 74, and a first seat ring shoulder 78. The illustrated tapered wall 66 is substantially frusto-conically shaped and arranged at about fifty-seven degrees plus or minus ten degrees (57°±10°) relative to the valve axis A. In other embodiments, the tapered wall 66 may be arranged at a different angle, as desired. The illustrated press ring wall 70 and stem cavity 74 are configured as substantially cylindrical walls, although they may have different shapes in other embodiments.

With reference to FIG. 1A, the second body member 30 includes a second mounting feature in the form of a flange 82 arranged for mounting to a pipe (not shown), a protruding portion 86 arranged to engage the recessed portion 38 of the first body member 26, a second passageway 90 along the valve axis A, a second fastener engaging feature in the form of a through hole (not shown) for engaging the first body member 26, a second seat ring shoulder 94, and a second mating surface 98. In other arrangements, the second mounting flange 82 can be arranged differently to mount to a pipe with threads or another coupling system, as desired.

The second mating surface 98 may be generally defined as the surface that engages and seals against the first body member 26. The illustrated second mating surface 98 includes a second outer portion 102 and a second body seal recess 106. The second outer portion 102 is arranged to be engaged to the first outer portion 54 in metal-to-metal contact. That is to say, the second outer portion 102 defines a flat wall arranged substantially perpendicular to the valve axis A and arranged to engage the flat wall of the first outer portion 54. In other embodiments, the first outer portion 54 and the second pouter portion may define a different profile, for example a tortured path metal-to-metal contact surface may be utilized.

The second body seal recess 106 is a mirror of the first body seal recess 58 and also defines a gradually decreasing depth moving radially outward from the valve axis A. The second body seal recess 106 is positioned radially inward of the second outer portion 102 with respect to the valve axis A. The protruding portion 86 is arranged radially inward from the second body seal recess 106 with respect to the valve axis A and sloped at an oblique angle relative to the valve axis A to match the recessed portion 38 of the first body member 26.

As shown in FIG. 1A and FIG. 1B, the ball assembly 18 includes a valve element 110, a first seat ring 114, a second seat ring 118, a press ring 122, a top flange 126, a spring element 130 in the form of a conical spring washer or Belleville spring, and a stem seal 134. The valve element 110 is fabricated from metal and includes a ball 138 defining an outer ball surface 142 and a port 146, and a ball stem 150 defining a ball stem axis B.

The first seat ring 114 and second seat ring 118 are tangential to the outer ball surface 142 and are fabricated from a fluoropolymer material such as polytetrafluoroethylene (PTFE), TFM or NXT which have sealing properties and also enable rotation of the valve element 110 about the ball stem axis B. Fluid flow through the ball valve 10 is enabled when the valve element 110 is rotated about the ball stem axis B and the port 146 is aligned with the first passageway 42 and the second passageway 90. Additionally, fluid flow through the ball valve 10 can be controlled and/or stopped when the valve element 110 is rotated about the ball stem axis B and the port 146 is misaligned with the first passageway 42 and the second passageway 90.

With reference to FIG. 1B, the press ring 122 defines an inner recess 154 receiving a stem O-ring 158, an outer recess 162 receiving a body O-ring 166, and a stem seal surface 170 shaped to engage the stem seal 134. The top flange 126 is threaded to the threaded aperture 62 of the first body member 26 and defines a recess 174 receiving an upper stem O-ring 178 that engages the ball stem 150. The spring element 130 is arranged between the top flange 126 and the press ring 122 to bias the press ring 122 towards the stem seal 134. In other embodiments, other spring elements or devices may be used, for example, a pressure biasing system or a living spring may be utilized.

Figure 2:
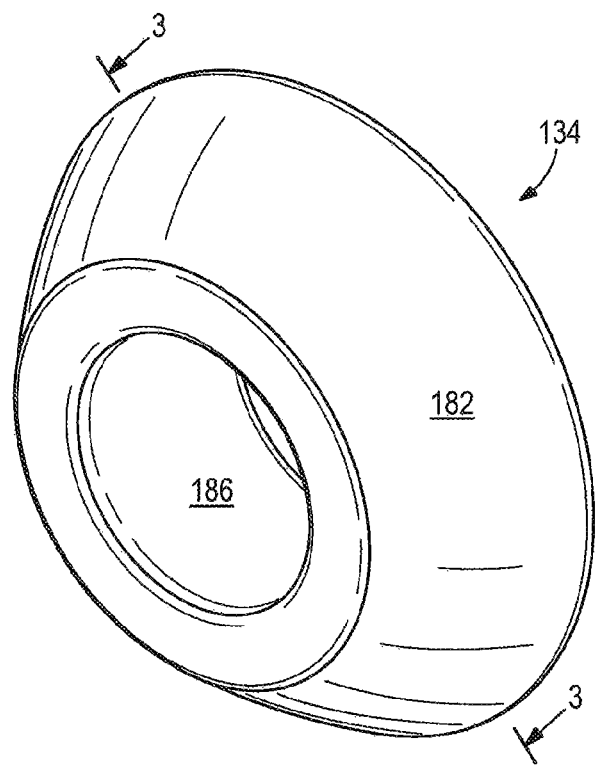
FIG. 2 is a bottom left pictorial view of a stem seal of the ball valve of FIG. 1A.
Figure 3:
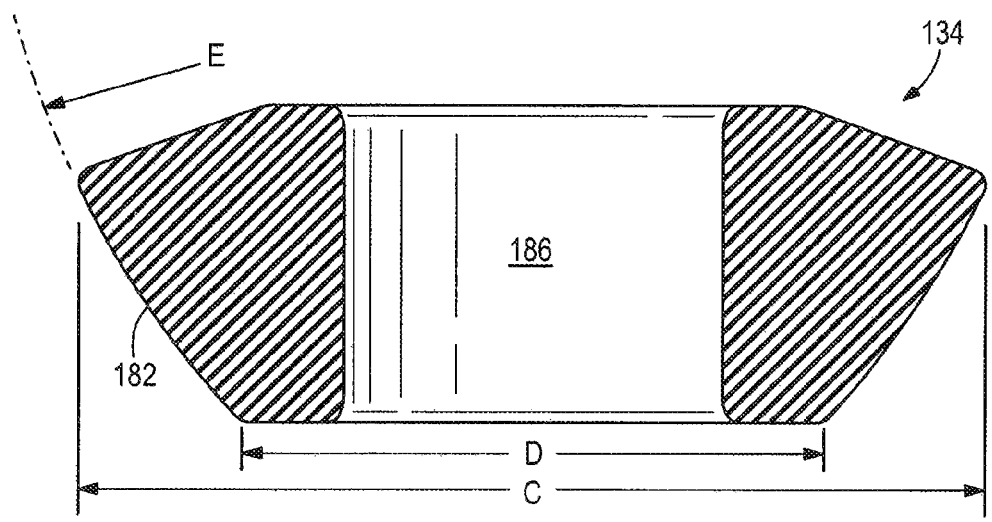
FIG. 3 is a section view of the stem seal of FIG. 2 taken along line 3-3 of FIG. 2.

Turning to FIGS. 2 and 3 the stem seal 134 includes a body sealing surface 182 and a stem sealing surface 186 for receiving the ball stem 150, defines a substantially frusto-conical shape, and is fabricated from a fluoropolymer material. The body sealing surface 182 defines a convex shape, a maximum diameter C, and a minimum diameter D. The illustrated convex surface has a radius of curvature E of about three-hundred millimeters (300 mm), the illustrated maximum diameter C is about thirty-eight millimeters (38 min), and the illustrated minimum diameter D is about twenty-four and a half millimeters (24.5 mm). A stem seal ratio E/C may be defined as a ratio of the radius of curvature E to the maximum diameter C. The illustrated stem seal ratio E/C is about eight (8). In other embodiments, the stem seal ratio E/C may be between about six and ten (6-10). In still other embodiments, the stem seal ratio E/C may be between about five and twelve (5-12).

With reference back to FIGS. 1A and 1B, the lining 22 provides protection for the valve body 14 and ball assembly 18 from corrosive fluids that flow through the first passageway 42, the second passageway 90, and the port 146. Additionally, the lining 22 has sealing properties and can be fabricated from a fluoropolymer such as perfluoroalkoxy polymer (PFA), polytetrafluoroethylene (PTFE), fluorinated ethylene-propylene (FEP), polyvinylidene fluoride and others. In one arrangement, the lining 22 has a thickness of approximately 2.5 mm to meet permeation requirements. In one embodiment, the lining 22 is applied to the ball valve 10 as a coating after casting and machining of the first body member 26, the second body member 30, and the valve element 110.

The lining 22 includes a first body lining 190, a second body lining 194, and a ball lining 198. The first body lining 190 includes a first flange portion 202, a first passageway portion 206, a first shoulder portion 210 that engages the first seat ring 114, a stem cavity portion 214, a tapered wall portion 218 that engages the body sealing surface 182 of the stem seal 134, a press ring portion 222 that engages the body O-ring 166, a recess portion 226, and a first body seal portion 230. The first body seal portion 230 of the first body lining 190 defines a gradually decreasing thickness corresponding to the first body seal recess 58.

The second body lining 194 includes a second flange portion 234, a second passageway portion 238, a second shoulder portion 242 that engages the second seat ring 118, a protruding portion 246, and a second body seal portion 250. The second body seal portion 250 of the second body lining 194 defines a gradually decreasing thickness corresponding to the second body seal recess 106. The first body seal portion 230 engages the second body seal portion 250 when the ball valve 10 is assembled and together they define a substantially cone shape cross-sectional sealing profile. In other words, with reference to FIG. 1B, a body seal or gasket defined by the combination of the first body seal portion 230 and the second body seal portion 250 defines a first thickness F at a first radial distance relative to the valve axis A and a second thickness G a second radial distance relatively farther from the valve axis A, and the second thickness G is less than the first thickness F. In other embodiments, the body seal may be formed by a single element arranged to provide a seal between the first body seal recess 58 and the second body seal recess 106.

With continued reference to FIG. 1A and FIG. 1B, the ball lining 198 includes a port portion 254, a ball portion 258 covering the outer ball surface 142 and arranged to engage the first seat ring 114 and the second seat ring 118, and a stem portion 262 that engages the body sealing surface 182 of the stem seal 134 and the stem O-ring 158.

Assembly of the ball valve 10 will be described with reference to FIG. 1A. The ball assembly 18 is installed into the first body member 26 by first seating the first seat ring 114 into the first shoulder portion 210, and then inserting the ball stem 150 through the stem cavity 74 and seating the ball 138 against the first seat ring 114, The stem seal 134 is then inserted onto the ball stem 150 and seated against the tapered portion 218. The press ring 122 is then inserted onto the ball stem 150, followed by the spring element 130. The top flange 126 is then threaded onto the threaded aperture 62 to secure the ball assembly 18 in place.

The second body member 30 is installed onto the assembled first body member 26 and ball assembly 18 by first seating the second seat ring 118 into the second shoulder portion 242, then bringing the protruding portion 86 into engagement with the recessed portion 38 such that the first body seal portion 230 and the second body seal portion 250 come into contact. Fasteners 266 are then installed and tightened such that the first body seal portion 230 and the second body seal portion 250 are compressed and a metal-to-metal contact is formed between the first outer portion 54 and the second outer portion 102.

With the ball valve 10 assembled, a fluid flow path is defined by the first passageway portion 206, the port portion 254, and the second passageway portion 238. As will be recognized, the entirety of the fluid flow path is coated in the lining 22 to inhibit corrosion. Additionally, should any fluid reach the stem cavity 74, the stem seal 134 interacts with the first body lining 190 and the ball lining 198 to inhibit corrosion of any components of the ball assembly 18.

In operation, with the ball valve 10 assembled and installed into a piping system as desired, the ball valve 10 is actuatable between an open position (See FIG. 1A) with the port 146 aligned with the first passageway 42 and the second passageway 90 such that fluid may pass along the fluid flow path. The valve element 110 is rotatable about the stem axis B to actuate the ball valve 10 between the open position and a closed position (See FIG. 6) wherein fluid flow between the first passageway portion 206 and the second passageway portion 238 is inhibited. The ball valve 10 may be actuated to a position between the open position and the closed position to provide a partial fluid flow along the fluid flow path.

Exemplary advantages of the inventive ball valve 10 will be discussed below with reference to the drawings. By no means is the following an exhaustive list of the numerous advantages provided by the invention, as will be understood by one of skill in the art in view of the claims.

With reference to FIG. 1B, the stem sealing arrangement provided by the ball assembly 18 is spring loaded and self-adjusted to compensate for the different thermal expansion of the components (e.g., the bodies 26 and 30, the valve element 110, and the fluoropolymer lining 22 and stem seal 134). Additionally, the substantially cone shape cross-sectional sealing profile of the body seal compensates for the different thermal expansion of the metal bodies 26 and 30 and the fluoropolymer lining 22.

In typical plastic lined ball valves used in corrosive environments, a central split design is utilized and slight misalignment of the body halves can lead to leakage. The present inventions side-split design provides a better sealed stem seal arrangement.

The sealing arrangement utilized between the two body halves of typical valves are not entrapped by a metal-to-metal contact as in the present invention such that the seal material tends to flow under compression or tends to leak due to uneven piping loads which exert a bending force on the valve bodies, requiring frequent re-tightening of the fasteners. The inventive outer portions 54 and 102 of the first mating surface 46 and the second mating surface 98 provide a metal-to-metal contact that both contains the body seal and provides a positive contact surface through with pipe loads and other forces may be passed without affecting the integrity of the body seat In other words, the substantially cone shape cross-sectional sealing profile is able to fluctuate in the radial direction relative to the valve axis A to compensate for the thermal expansion of the fluoropolymer or the wear to ensure a bubble and fugitive emission tightness across the full pressure and temperature range of the valve. This arrangement leads to a significant improvement in the reliability of the body seal to prevent leakage. The inventive ball valve 10 is air bubble tight according to DIN EN 12266-1 and fugitive emission tight according to ISO 15848-1.

Figure 4:
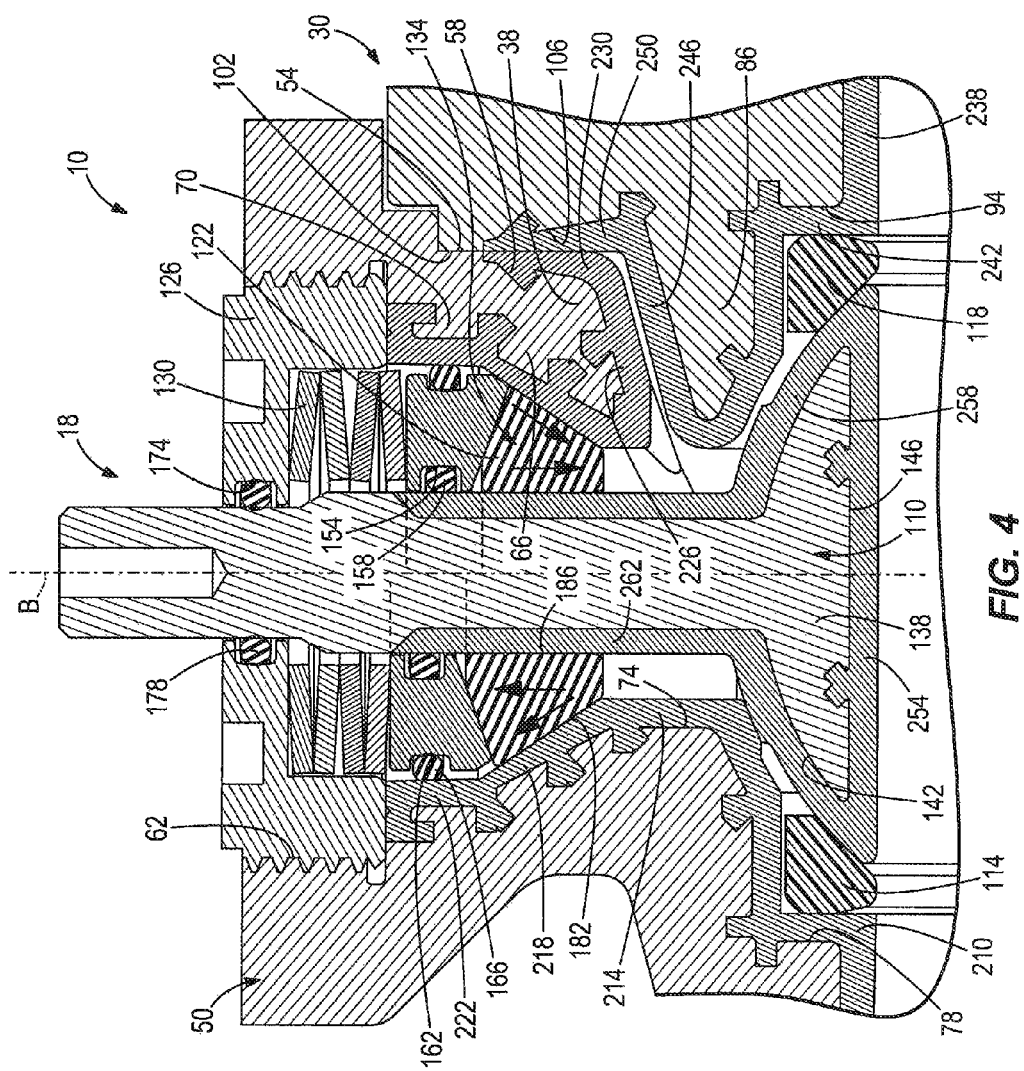
FIG. 4 is a partial section view of the ball valve of FIG. 1A illustrating thermal expansion of the stem seal has occurred on a first side of the ball valve and thermal contraction of the stem seal has occurred on a second side of the ball valve.

With reference to FIG. 4, the inventive stem seal 134 provides a substantially line contact sealing arrangement with the tapered portion 218 of the first body lining 190. Under high pressure conditions, a relatively higher pressure may be exhibited on a first side of the stem seal 134 (e.g., left in FIG. 4) relative to a second side of the stem seal 134 (e.g., lower pressure shown on the right side in FIG. 4). The stem seal 134 is able to accommodate pressure differentials better than prior art stem seals by flexing and deflecting as shown while maintaining the line contact. Likewise, temperature differentials may be created within the stem seal 134 and the line contact of the stem seal 134 is able to compensate for thermal expansion or contraction of the stem seal 134, the ball stem 150, and the first body lining 190.

Figure 5:
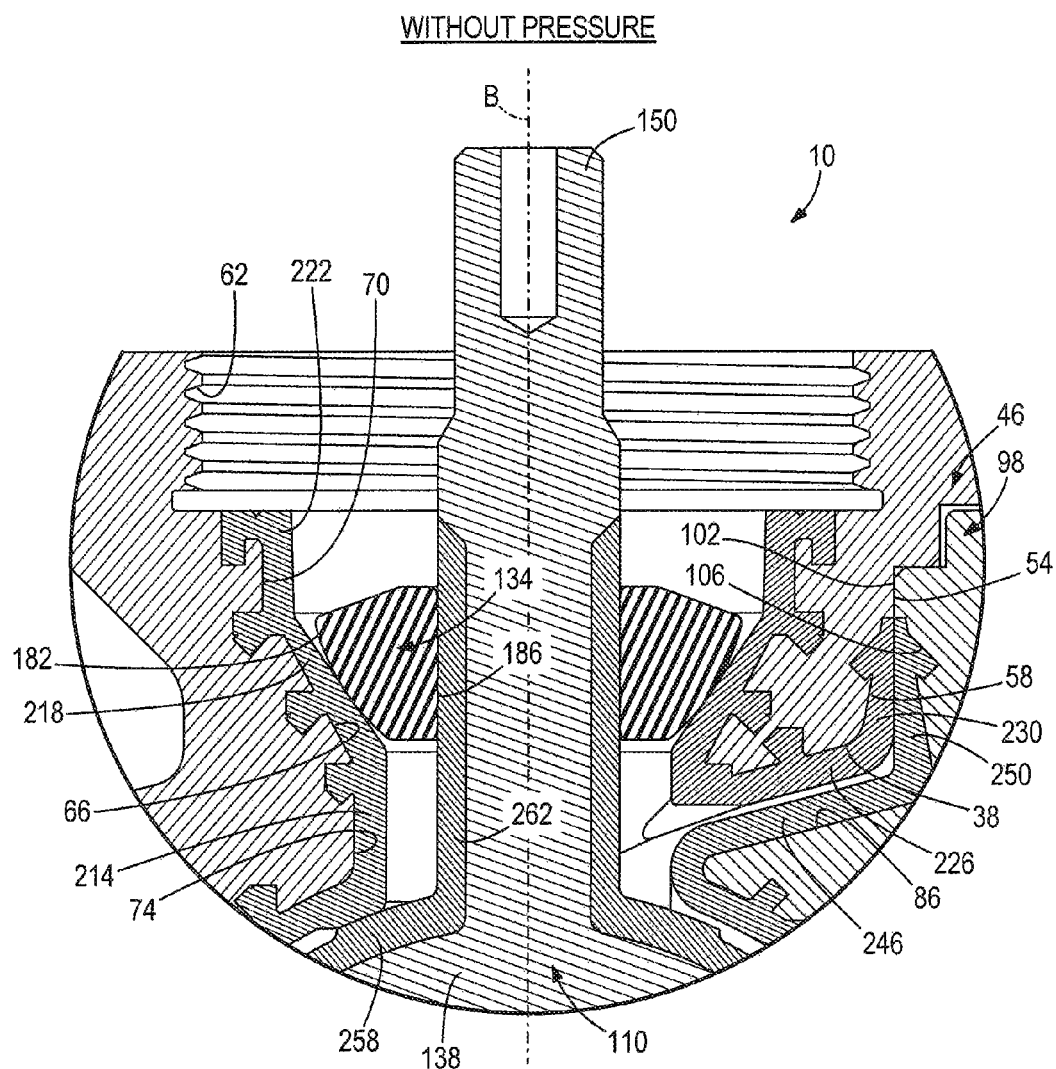
FIG. 5 is a partial section view of the ball valve of FIG. 1A illustrating no pressure exerted on a valve element.
Figure 6:
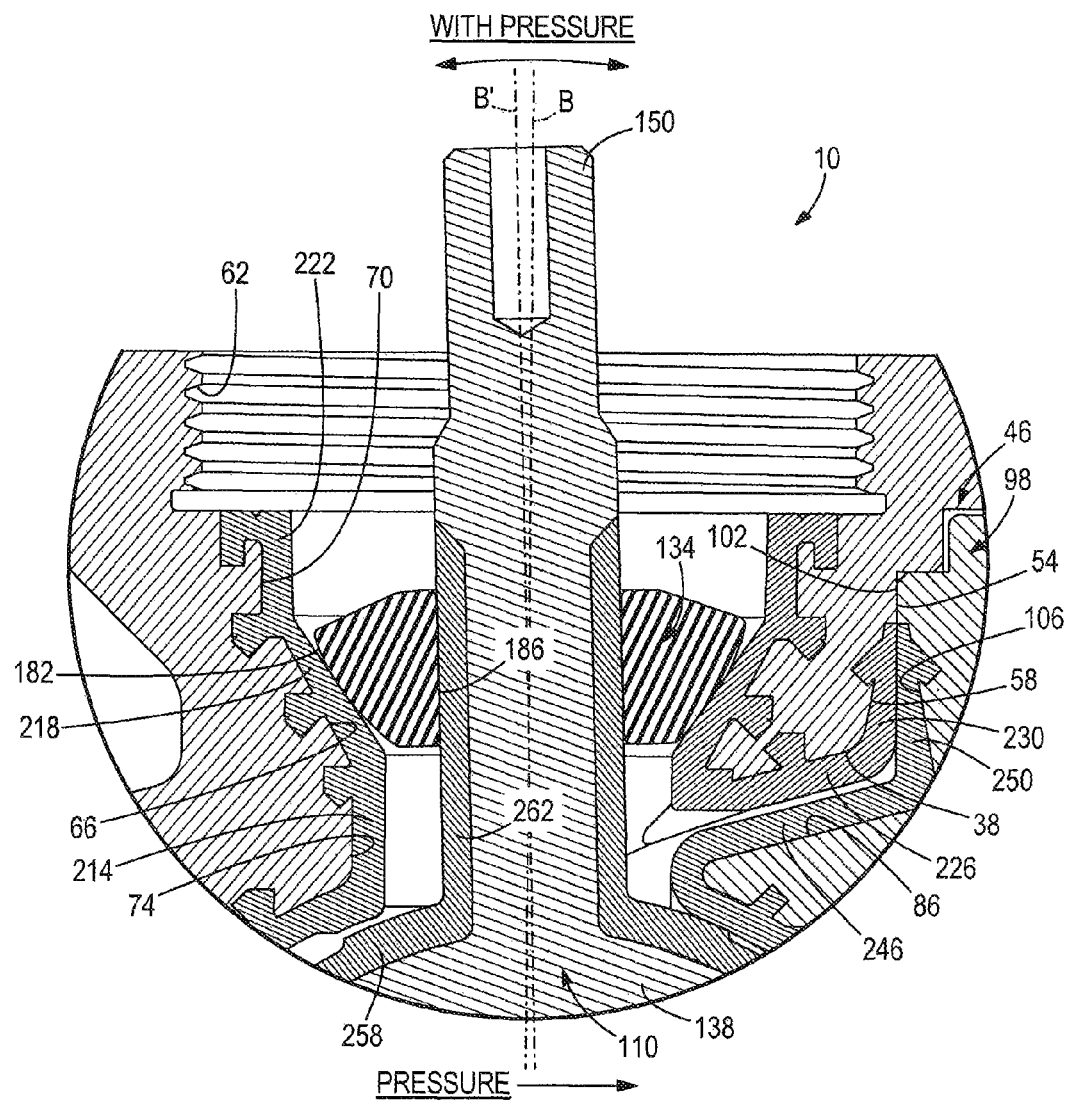
FIG. 6 is a partial section view of the ball valve of FIG. 1B illustrating pressure exerted on the valve element.

Turning to FIGS. 5 and 6, the radius of curvature E of the convex surface and the line contact formed thereby is clearly shown. FIG. 5 illustrates the ball valve 10 in the open position and experiencing no substantial pressure differential acting on the valve element 110. FIG. 6 shows the ball valve 10 in the closed position. With high pressure fluid in the first passageway portion, and relatively lower pressure existing in the second passageway portion 238, a force is exerted on the ball of the valve element 110 affecting a rotation of the valve element 110 as depicted in FIG. 6. In other words, the stem axis B skews out of perpendicular relative to the valve axis A into the position shown and represented along axis B'. The line contact of the stem seal 134 compensates for such deflection and maintains a functional stem seal arrangement and inhibits leakage therethrough.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

We claim:

1. A ball valve, comprising: a valve body including a first body member and a second body member, the valve body defining a valve axis and a fluid flow path; a ball element having a port and a ball stem, the ball element rotatable about a ball stem axis between an open position providing fluid flow through the fluid flow path and a closed position inhibiting flow through the fluid flow path; a body seal providing a seal between a first mating surface of the first body member and a second mating surface the second body member, and defining a thickness that decreases as the body seal extends away from the valve axis between the first mating surface and the second mating surface; and a stem seal defining a substantially frusto-conical shape and arranged in the valve body, the ball stem extending through the stem seal to form a seal between the ball stem and the stem seal and between the stem seal and the valve body.

2. The ball valve of claim 1, further comprising a spring element that preloads the stem seal.

3. The ball valve of claim 2, wherein the spring element is adjustable to maintain a stress level in the stem seal within a desired stress level and to provide sufficient contact to maintain the seal between the ball stem and the stem seal and between the ball stem and the valve body.

4. The ball valve of claim 1, wherein the body seal is offset from the ball stem axis to form a side body split configuration.

5. The ball valve of claim 1, wherein the first body member is in metal-to-metal contact with the second body member.

6. The ball valve of claim 1, wherein the body seal defines a substantially cone shaped cross-sectional sealing profile.

7. The ball valve of claim 1, further comprising a press ring located between the spring element and the stem seal.

8. The ball valve of claim 1, wherein the stem seal is fabricated from a fluoropolymer material.

9. The ball valve of claim 1, wherein the stem seal defines a convex sealing surface.

10. The ball valve of claim 9, wherein a stem seal ratio of a radius of curvature of the convex sealing surface and a diameter of the stem seal is between about five and twelve.

11. The ball valve of claim 9, wherein the valve body defines a tapered wall engaged with the convex sealing surface to form a line contact seal such that the line contact seal is maintained in the presence of ball stem displacement.

12. The ball valve of claim 1, wherein the first body member includes a first body lining, the second body member includes a second body lining, and the ball element includes a ball lining.

13. The ball valve of claim 12, wherein the first body lining, the second body lining, and the ball lining are fabricated from a fluoropolymer material.

14. The ball valve of claim 12, wherein the body seal is formed at least in part by at least one of the first body lining, the second body lining, and the ball lining.

15. The ball valve of claim 1, wherein the valve body defines a tapered wall for receiving the stem seal.

16. The ball valve of claim 1, wherein the fluid flow path and port include a lining fabricated from a fluoropolymer material that has a minimum thickness of approximately 2.5 millimeters.

17. The ball valve of claim 1, wherein the body seal includes a lining fabricated from a fluoropolymer material.

18. The ball valve of claim 1, wherein all surfaces along the fluid flow path include a lining.

19. The ball valve of claim 18, wherein the lining is fabricated from a fluoropolymer material.

20. The ball valve of claim 1, wherein the first body member engages the second body member and forms a metal-to-metal contact therebetween, the body seal arranged radially inward of the metal-to-metal contact relative to the valve axis such that external loads imposed on the ball valve are carried by the metal-to-metal contact and not the body seal.

* * * * *